United States Patent
Chen et al.

(10) Patent No.: US 8,354,138 B2
(45) Date of Patent: Jan. 15, 2013

(54) PREPARING METHOD FOR COATING PMMA PARTICLES WITH SILICON DIOXIDE

(75) Inventors: Yen-Chung Chen, Longtan Shiang (TW); Hsiou-Jeng Shy, Sanchong (TW); Ming-Der Ger, Daxi Town (TW); Hung-Fang Huang, Daxi Township, Taoyuan County (TW); Shang-Wanq Yeh, Longtan Shiang (TW)

(73) Assignee: Chung-Shan Institute of Science and Technology, Armaments Bureau, Ministry of National Defense, Taoyuan County (TW)

( * ) Notice: Subject to any disclaimer, the term of this patent is extended or adjusted under 35 U.S.C. 154(b) by 566 days.

(21) Appl. No.: 12/637,713

(22) Filed: Dec. 14, 2009

(65) Prior Publication Data
US 2011/0143029 A1    Jun. 16, 2011

(51) Int. Cl.
| | | |
|---|---|---|
| *B05D 5/12* | (2006.01) | |
| *B05D 7/00* | (2006.01) | |
| *B01J 13/02* | (2006.01) | |
| *C23C 16/00* | (2006.01) | |
| *C04B 28/26* | (2006.01) | |
| *B32B 5/16* | (2006.01) | |
| *B32B 9/00* | (2006.01) | |
| *B32B 15/02* | (2006.01) | |
| *B32B 17/02* | (2006.01) | |
| *B32B 19/00* | (2006.01) | |
| *B32B 21/02* | (2006.01) | |
| *B32B 23/02* | (2006.01) | |
| *B32B 27/02* | (2006.01) | |

(52) U.S. Cl. .................. 427/212; 427/126.3; 427/213.3; 427/222; 427/255.37; 106/287.34; 428/402; 428/403; 428/357

(58) Field of Classification Search ............... 427/126.3, 427/212, 213.3, 222, 255.37; 106/287.34; 428/402, 403, 357
See application file for complete search history.

(56) References Cited

U.S. PATENT DOCUMENTS
2,404,457 A    7/1946 Reeves
(Continued)

FOREIGN PATENT DOCUMENTS
TW    255826    6/2006

OTHER PUBLICATIONS
"Sparsely-distributed silica/PMMA composite particles prepared by static polymerization in aqueous silica dispersion," Shintaro Kawano et al. Journal of Colloid and Interface Science 352 (2010), pp. 348-353.*

(Continued)

*Primary Examiner* — Patricia L Hailey (57) ABSTRACT

A preparing method for coating polymethylmethacrylate (PMMA) particles with silicon dioxide is disclosed and includes the following steps of: preparing a silicon dioxide solution by mixing a silicon dioxide powder and a solvent; adding a dispersant-and-interface-modifier agent into the silicon dioxide solution; performing a wet grinding to the silicon dioxide solution with the dispersant-and-interface-modifier agent so as to obtain a plurality of nano-sized silicon dioxide particles with negative charge; performing an interface modification to a plurality of PMMA particles to be charged with positive charge; adding the PMMA particles into the silicon dioxide solution; making the PMMA particles adsorb the nano-sized silicon dioxide particles; and performing a solid-liquid separation process to the silicon dioxide solution so as to obtain the chemical composite particles.

11 Claims, 4 Drawing Sheets

U.S. PATENT DOCUMENTS

| | | | |
|---|---|---|---|
| 3,451,838 A | | 6/1969 | Burzynski et al. |
| 4,877,451 A | | 10/1989 | Winnik et al. |
| 5,569,497 A | * | 10/1996 | Verzaro et al. ............... 427/489 |
| 6,871,994 B2 | | 3/2005 | Harada et al. |
| 6,888,663 B2 | | 5/2005 | Bourdelais et al. |
| 7,915,327 B2 | * | 3/2011 | Keoshkerian et al. ........ 523/201 |
| 2007/0126002 A1 | * | 6/2007 | Moriya et al. ................. 257/40 |

OTHER PUBLICATIONS

"Effects of surface treatments and deposition conditions on the adhesion of silicon dioxide thin film on polymethylmethacrylate," Y. M. Lian et al. Surface and Coatings Technology 71 (1995), pp. 142-150.*

"A Novel Preparation Method of Raspberry-like PMMA/SiO2 Hybrid Microspheres," Min Chen et al. Macromolecules (2005), 38, pp. 6411-6417.*

"Synthesis of Raspberry-like PMMA/SiO2 Nanocomposite Particles via a Surfactant-Free Method," Min Chen et al. Macromolecules (2004), 37, pp. 9613-9619.*

"Preparation of villus-like PMMA/silica hybrids via surface modification and wet grinding," Yen-Chung Chen et al. Journal of Alloys and Compounds 507 (2010), pp. 302-308.*

"Preparation of transparent silica-PMMA nanocomposite hard coatings," Joseph Lik Hang Chau et al. Progress in Organic Coatings 62 (2008), pp. 436-439.*

"Synthesis of core-shell PMMA-SiO2 nanoparticles with suspension-dispersion-polymerization in an aqueous system and its effect on mechanical properties of PVC composites," Aiping Zhu et al. Polymer Testing 27 (2008), pp. 540-547.*

* cited by examiner

PREPARING METHOD FOR COATING PMMA PARTICLES WITH SILICON DIOXIDE

BACKGROUND OF THE INVENTION

1. Field of the Invention

This invention relates to a preparing method for coating PMMA (polymethylmethacrylate) particles with silicon dioxide and more particularly relates to a preparing method for complex particles with optical diffusion and villiform structure by coating PMMA particles with silicon dioxide.

2. Description of the Prior Art

As photo-electronic industry develops and innovates, various projectors and liquid crystal displays (LCDs) are common displays in families or commerce occasions gradually. The electronic apparatuses for projecting light are often applied to light-guiding plates or lenses for propagating light. At the earliest, the light-guiding plates or lenses are made of glass. However, it is unavoidable to encounter a bottleneck in mass production using such material of glass; the weight and the abrasion resistance are therefore limited. Recently, chemical polymerized material is used for new light-guiding devices in place of glass. It is applied to various optical productions, such as light-guiding members for LCD, front panels for plasma display panel (PDP), and project screens.

For example of LCD, liquid crystal itself does not light. There is a backlight as the light source. In practical applications, the light-guiding plate for notebook is formed by injecting PMMA. The light-guiding plate guides the light form a cold cathode fluorescent lamp (CFEL) or a light-emitting diode (LED) to the surface of the liquid crystal. The absorption of the light in the propagation in the light-guiding plate is much less so as to reduce the single loss to the minimum. In another aspect, the LCD panels used in the application of liquid crystal television are a little different to those used in notebooks or desktops. Especially, a large-size liquid crystal television does not use an edge light source but a direct-light backlight. Multiple CFFLs are provided for light so as to achieve the requirement of high brightness and high contrast. The light from the direct-light backlight need to pass through a layer of diffuser plate for preventing the non-uniform distribution of the light.

Figure 1:
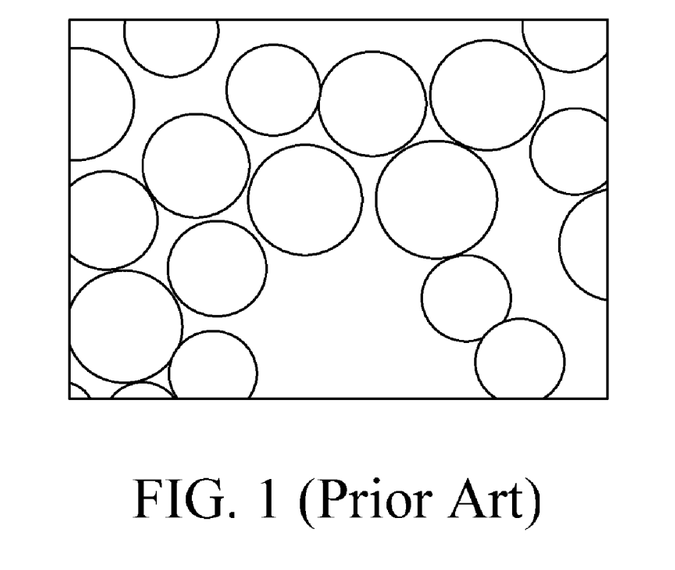
FIG. 1 is a diagram of an SEM (scanning electron microscope) picture of PMMA particles in the prior art.

In general, the early diffuser plate for guiding light made of PMMA or PS (polystyrene) diffusive particles are most seen. Please refer to FIG. 1. FIG. 1 is a diagram of an SEM (scanning electron microscope) picture of PMMA particles in the prior art. The preparing method for the PMMA diffusive particles is performed by dissolving a PVP (polyvinyl pyrrolidone) dispersant, MMA (methylmethacrylate) monomers and an AIBN (azobisisobutyronitrile) initiator in the solvent of ethyl alcohol and water to obtain a solution. The solution reacts under 70 degrees in Celsius for six fours. After the reaction is completed, the solution is cooled to obtain dispersive polymer. The dispersive polymer is then centrifugally rotated and precipitates. The PMMA particles are washed by absolute alcohol several times to remove un-reacted monomers and lower polymer and then dried in vacuum for 24 hours to obtain the PMMA diffusive particles (as shown in FIG. 1). A diffuser plate coated with the conventional diffusive particles has the advantages of less weight, high abrasion resistance, anti-electrification, and anti-reflection.

However in another aspect, the conventional diffusive particle has disadvantages of low rigidity, high hygroscopicity and yellowing problem due to high temperature process environment. In practical applications in photo-electronic industry, the conventional diffuser plate coated with the diffusive particles (PMMA, PS, PC) encounters its limit. A replacing material is needed. In the prior art, the diffuser agent is macromolecular microspheres. The penetrability is good, while the heat resistance, the weathering, and the dimensional stability are poor than the inorganic diffusive particles. For the goals of high penetrability, high haze and high luminance, an organic-inorganic complex is used to make new diffusive particles recently. The glass transition temperature (Tg), the refractivity, the optical loss, and the thermal expansion coefficient could be adjusted on the content proportion of the organic-inorganic complex. In practical applications, the organic-inorganic complex is usually formed by mixing PMMA and silicon dioxide.

If inorganic material is added into hydrophobic organic macromolecular material, the inorganic material needs to be treated by an interface modification process first so as to overcome the problems of compatibility and coagulation due to the hydrophile surface of the inorganic material. For the surface modification techniques of inorganic material, there are many studies, such as U.S. Pat. Nos. 3,451,838 and 2,404,457 which disclose a coated layer mainly consisting of alkoxysilane hydrate and colloidal silicon dioxide. U.S. Pat. No. 4,877,451 discloses a surface modification on silicon dioxide particles by a coupling agent of hydroxylalkylsilane and aminoalkylsilane, so that organic colorant is bound to the surface of the silicon dioxide particles. The above patents disclose the interface modification to inorganic particles, not the relative means and effect of the complex process of inorganic particles and organic particles.

For organic-inorganic complex particles, Taiwan patent no. I255826 discloses silicon dioxide particles processed by an interface modification. The silicon dioxide particles could be mixed and dispersed in organic macromolecule so as to enhance the mechanical properties of the complex. For the preparing the complex coating material of PMMA and silicon dioxide, U.S. Pat. No. 6,871,994 discloses coating material formed by mixing macromolecule microspheres into an adhesive. U.S. Pat. No. 6,888,663 discloses a diffusive film formed by mixing only clay as diffusive particles which are first processed by an interface modification into macromolecule. That is, in the prior art, most of the complex of PMMA and silicon dioxide is prepared by mixing. The method thereof is to mix acrylic monomer MMA, silane coupling agent and silicon dioxide to a film; the execution thereof is to mix and disperse silicon dioxide particles into organic macromolecule. The structure of the above complex particles is formed by further polymerizing the silicon dioxide MMA particles; that is, the silicon dioxide particles mixed and dispersed in both the interior and the exterior of the whole complex particle. Although the complex particles formed by such method has improved mechanical properties, because the silicon dioxide particles are mixed in the whole complex particle and holes are easily present in the film of silicon dioxide particles so that the silicon dioxide particles could not dispersed uniformly, the film is easily formed with cracks thereon and the improvement to the optical properties is poor.

In another preparation of film, TEOS (tetraethoxy silane), acrylic monomers, a coupling agent, and an initiator are thermally polymerized to form macromolecule. However, the curing temperature is lower, so more silicon hydroxyl remains so that the pre-polymer before coating is unstable and easy to gel and uniform coating of silicon dioxide on the surface of the microspheres occurs easily. In addition, the problem of non-uniform particle size of the silicon dioxide particles inside the film also affects the optical homogeneity of the film.

At present, for solving the disadvantages in the preparation of the above inorganic-organic macromolecule, silicon dioxide is usually regarded as filler for the macromolecule, and silicon dioxide and the macromolecule are inorganic-organic mixed to enhance the thermal stability and the mechanical properties. The invention, from the material for an optical diffusive film, is to modify the complex particle itself and to adsorb nano-sized silicon dioxide particles on the surface of the PMMA microspheres, so that the surface of the microsphere forms a rough villiform or irregular structure capable of multiply optically reflecting and refracting and has a better optical diffusive property than the original smooth surface of the microsphere. The invention therefore overcomes the disadvantages of the non-uniform distribution of the diffusive film and easily producing holes in the process of mixing silicon dioxide particles.

For macromolecule diffusive particles or macromolecule-inorganic complex diffusive particles in the convention, the sphere form and the particle size distribution thereof affect its optical diffusive distribution. For a single sphere, the often-seen complex particle could be an inorganic-organic complex particle with the core-shell interior structure and an organic-inorganic complex particle with villiform structure. The organic-inorganic complex particles with villiform and core-shell structure of the invention is formed by interface modifying the surface of the macromolecule particle to further adsorb silicon dioxide particles to improve the optical properties thereof. Compared with the prior art from the view of the diffusion effect of optical design, the diffusion effect of the villiform and core-shell structure is better than that of single macromolecule particle.

The invention discloses a new preparing method for preparing chemical complex particles with villiform structure for optical diffusion, so as to solve the above problem.

SUMMARY OF THE INVENTION

A scope of the invention is to provide a preparing method for coating PMMA particles with silicon dioxide which includes the following steps of: (a) preparing a silicon dioxide solution by mixing a silicon dioxide powder and a solvent; (b) adding a dispersant-and-interface-modifier agent into the silicon dioxide solution; (c) performing a wet grinding to the silicon dioxide solution with the dispersant-and-interface-modifier agent so as to obtain a plurality of nano-sized silicon dioxide particles with negative charge; (d) performing an interface modification to a plurality of PMMA particles to be charged with positive charge; (e) adding the PMMA particles into the silicon dioxide solution; (f) making the PMMA particles adsorb the nano-sized silicon dioxide particles; and (g) performing a solid-liquid separation process to the silicon dioxide solution so as to obtain chemical complex particles.

The PMMA-silicon dioxide complex particle of the invention has a sphere structure with villiform structure thereon by coating macromolecule PMMA particle with silicon dioxide particles. The preparing method for coating macromolecule PMMA particle with silicon dioxide particles of the invention is disclosed. The core particle of the complex particle is a PMMA particle. Many nano-sized silicon dioxide particles are adsorbed on the surface of the PMMA particle. There is no silicon dioxide particle inside the PMMA particle. Therefore, it is different to the preparing method in the prior art of free radical or sol-gel mixing. The conventional method cannot control the quality of the optical films. The villiform chemical complex particle of the invention introduces a novel coating method. The complex particle with villiform structure for optical diffusion has a different diffusion effects because of the different coefficients of refractivity of the inner PMMA microsphere and the shell of silicon dioxide particles. The total diffusion efficiency is higher than that of mono-PMMA particle. The sphere with villiform and core-shell structure makes the chemical particle imply a design of both diffusion and reflection. On the basis of the addition of multiple refraction and diffusion, even when high-angle light is reflected, a light field of uniform diffusion-reflection could still be maintained, so as to enhance the ability of light diffusion.

When the PMMA-silicon dioxide complex particles with villiform and core-shell structure of the invention are used for preparing optical films, they could be mixed with an organic solvent in an adjustable inorganic-organic proportion so as to enhance the thermal stability and the mechanical properties. When the complex particles of the invention and acrylic liquid resin are mixed uniformly, the non-uniform mix effect on the proportion of PMMA to silicon dioxide particles in the prior art could be greatly improved. Besides, the complex particles with villiform structure could improve the thermal resistance, penetrability and haze and reduce the holes of the film and the gel phenomenon, so as to solve many problems in the prior art. The PMMA-silicon dioxide complex particles of the invention could therefore be more suitable for backlight modules of LCD or other lamp assemblies.

The advantage and spirit of the invention may be understood by the following recitations together with the appended drawings.

DETAILED DESCRIPTION OF THE INVENTION

The invention discloses a preparing method for coating PMMA particles with silicon dioxide particles to be in form of a villiform and core-shell structure for optical diffusion applications. The method is to perform an interface modification to silicon dioxide particles by an interface modifier to be adsorbed on the surface of PMMA particles, and chemical complex particles with good optical and physical properties are therefore formed.

Figure 2:
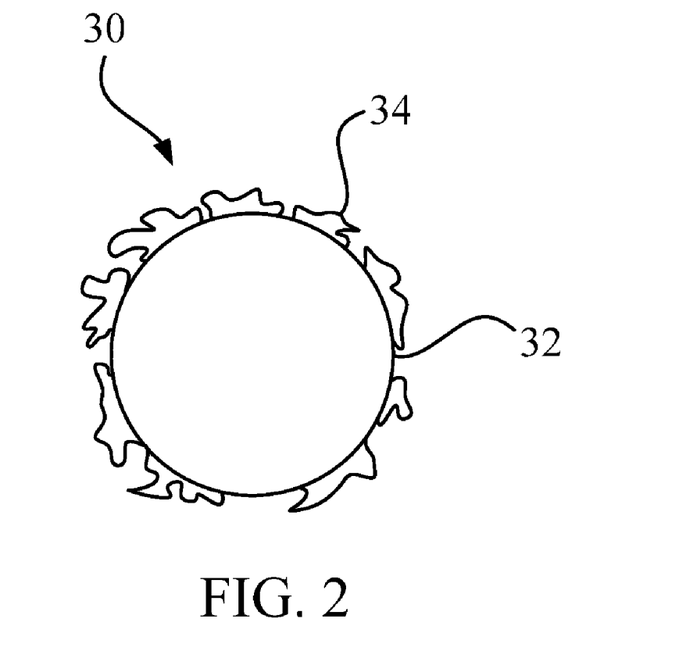
FIG. 2 is a schematic diagram illustrating a chemical complex particle according to an embodiment of the invention.

Please refer to FIG. 2. FIG. 2 is a schematic diagram illustrating a chemical complex particle 30 according to an embodiment of the invention. As shown in FIG. 2, the core portion of the chemical complex particle 30 is a PMMA particle 32, on whose surface a plurality of nano-sized silicon dioxide particles modified by an interface modifier are adsorbed. Therein, the nano-sized particles are processed by the interface modifier which is regarded as the bridge between the organic polymer (PMMA) and the inorganic particles (silicon dioxide) in the above adsorption.

Figure 3:
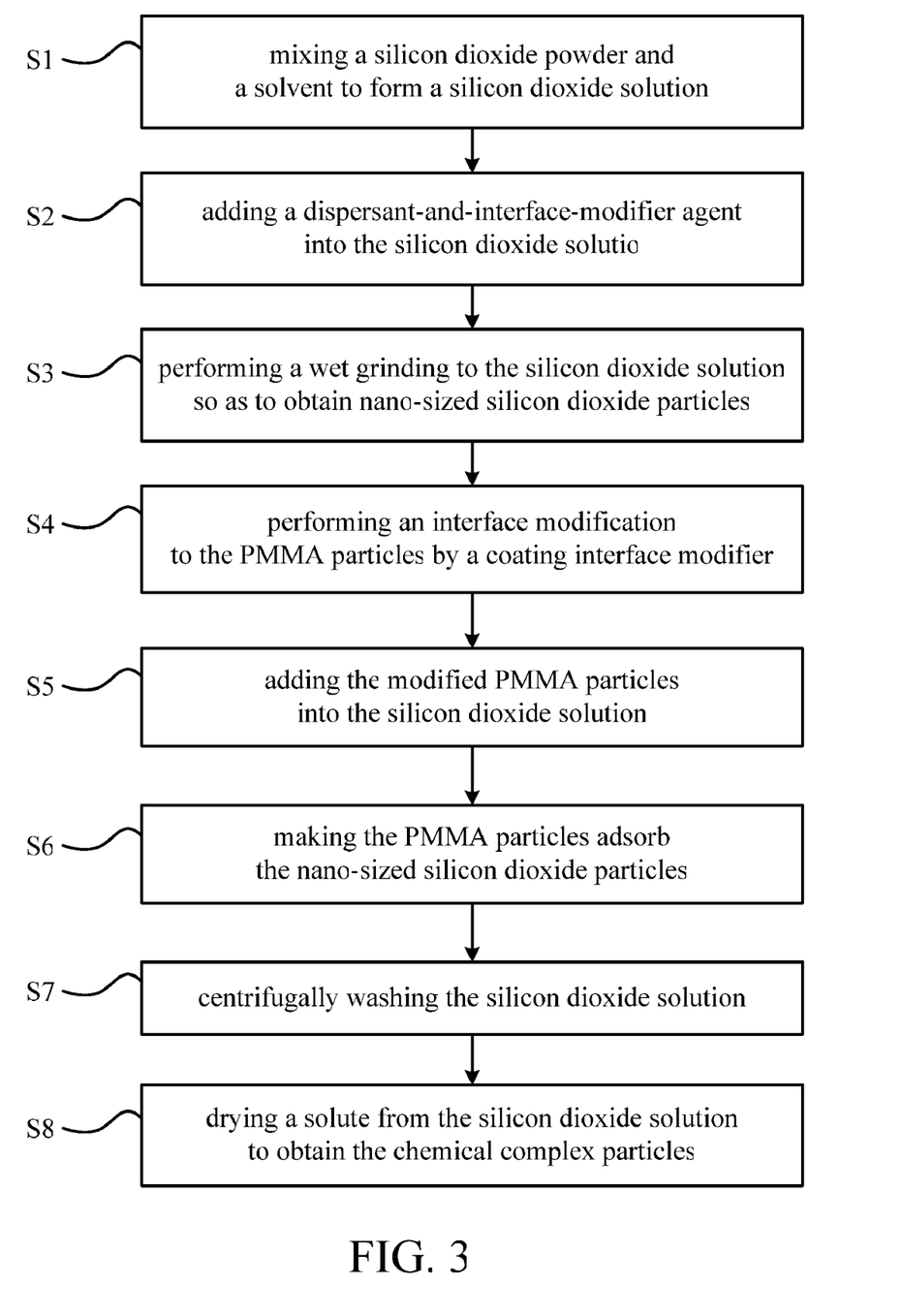
FIG. 3 is a flow chart of the preparing method for coating the PMMA particles with silicon dioxide particles in FIG. 2.

Please refer to FIG. 3. FIG. 3 is a flow chart of the preparing method for coating the PMMA particles with silicon dioxide particles in FIG. 2. In this embodiment, the preparing method includes the following steps.

First, the step S1 is performed by mixing a silicon dioxide powder and a solvent to obtain a silicon dioxide solution. In this embodiment, the silicon dioxide powder of good penetrability is used, such as product no. TS100 of Degussa corp. The solvent could be pure water, IPA (isopropyl alcohol), MEK (methyl ethyl ketone), or methylbenzene. The weight percent concentration of the silicon dioxide powder to the silicon dioxide solution is 1% to 30%. The primary particle size of commercial nano-sized silicon dioxide particles is between 10 nanometers to 30 nanometers. The silicon dioxide particles without interface modification tend to aggregation. The particles aggregate to form silicon dioxide particles with particle size of several micrometers. The above silicon dioxide particles could be grinded to only 8 micrometers by a conventional dry grinding, but to 0.2 micrometer or less by a wet grinding, even several tens nanometers. In order to avoid the aggregation, the step S2 is performed by adding a dispersant-and-interface-modifier agent into the silicon dioxide solution. The wet grinding is performed to the mixed solution of the powder and the solvent. In order to avoid the aggregation during the wet grinding, the dispersant needs to be added in as grinding aid or interface-modifier.

The invention uses a silane coupling agent as the dispersant-and-interface-modifier agent; a commercial interfacial agent could be used alternatively. The composition of the interfacial agent should have a derivative with a methyl functional group or non-ionic fatty acid. The silane coupling agent and the commercial interfacial agent could be mixed for use. The chemical formula of the silane coupling agent is represented as following:

wherein R represents $CH_3$, $C_2H_5$, or $(CH_2)_2OCH_3$, Y represents a functional group, and n is 0 or 3. In the embodiment, the functional group Y could be $CH=CH_2$(vinyl group), $H_2N$(amino group), $CH_2=CHCH_3COO$(methacryloxy group), or $CH_2OCHCH_2O$(glycidyloxy group).

The solvent for the wet grinding could be pure water, IPA, MEK, or methylbenzene. The weight percent concentration of the dispersant-and-interface-modifier agent to the silicon dioxide is 1% to 50%. During the process, a wetting agent could be added. The weight percent concentration of the wetting agent to the silicon dioxide is 1% to 20%.

The step S3 is then performed by performing a wet grinding to the silicon dioxide solution with the dispersant-and-interface-modifier agent so as to obtain a plurality of nano-sized silicon dioxide particles. In the embodiment, the median particle size (D50) of the nano-sized silicon dioxide particles after the wet grinding is between 20 nanometers to 250 nanometers. The nano-sized silicon dioxide particles are modified on interface by the dispersant-and-interface-modifier agent. The dispersant-and-interface-modifier agent includes sliane coupling agent or interfacial agent and has a function of dispersion after the wet grinding. The surface of the modified silicon dioxide particle is measured by a Zeta-potential meter to be with negative charge, so there are static repulsion and space barrier between the particles. The nano-sized suspension is therefore formed (i.e. the particles will not precipitate). The occurrence of aggregation could be reduced greatly. In the embodiment, every interfacial modified nano-sized silicon dioxide particle is represented by $SiO_2$-Silane.

The weight percent concentration of the dispersant-and-interface-modifier agent to silicon dioxide is 1% to 50%. The dispersant-and-interface-modifier agent could be a sliane coupling agent or an interfacial agent. The interfacial modified $SiO_2$-Silane is analyzed in penetrability under ultraviolet-visible ray by an absorption spectrometer, and the mixed solution of $SiO_2$-Silane and methylbenzene is analyzed in penetrability of the interface of $SiO_2$-Silane and methylbenzene. According to the penetrability thereof, the hydrophobic thereof is listed in an order of from large to small: vinyl group>methacryloxy group>glycidyloxy group>amino group. In the embodiment, in view of the above hydrophobic thereof, the sliane coupling agent will reacts with silicon dioxide by covalent bonding. In sliane coupling agents, the hydrophobic of VTEO (Triethoxyvinylsilane, hereafter VTEO) with C=C functional group and MEMO (3-Methacryloxypropyltrimethoxysilane, hereafter MEMO) with C=O functional group is better.

Afterwards, the step S4 is performed. The invention uses a coating interface modifier to modify PMMA particles. The coating interface modifier could be an ion additive. In practical application, the ion additive includes one selected from the group of 2-(methacryloyloxy)methyl-trimethylammonium chloride, 2-(methacryloyloxy)ethyl-trimethylammonium chloride, a mixture of 3-methacryloxy-propyl-trimethoxysilane with hydrochloric acid or sulfuric acid, and a mixture of 2-(methacryloyloxy)methyl-trimethylammonium chloride with 2-(methacryloyloxy)ethyl-trimethylammonium chloride.

The above modified PMMA particles are measured by a Zeta-potential meter to be with positive charge.

The step S5 is then performed by adding the modified PMMA particles into the silicon dioxide solution. And the step S6 is performed to make the PMMA particles adsorb the nano-sized silicon dioxide particles. Therefore, the preparing method of the invention is to perform an interface modification to the nano-sized silicon dioxide particles to be hydrophobic and also to an interface modification to the PMMA particles, so as to enhance the adsorbability between the PMMA particles and the silicon dioxide. In other words, the preparing method for coating PMMA particles with silicon dioxide of the invention uses the attractive force induced by the positive and negative charges to overcome the interface energy barrier therebetween. In addition, in the above applications, the complex particles of PMMA-silicon dioxide are formed with particle size between 100 nanometers to 100 micrometers.

Afterwards, a solid-liquid separation process is performed to the silicon dioxide solution. The detailed steps of the solid-liquid separation process could be divided into the steps S7 and S8. The step S7 is first performed by centrifugally washing the silicon dioxide solution. In the embodiment, the solid-liquid separation could be realized by deflating-and-filtering or a centrifuge. The step S8 is then performed by getting a solute from the silicon dioxide solution and drying the solute so as to obtain the chemical complex particles. The chemical complex particles are formed of PMMA and silicon dioxide. The particle size of the chemical complex particles is between 100 nanometers to 100 micrometers. Every chemical complex particle is represented by PMMA-Silane-$SiO_2$.

Figure 4:
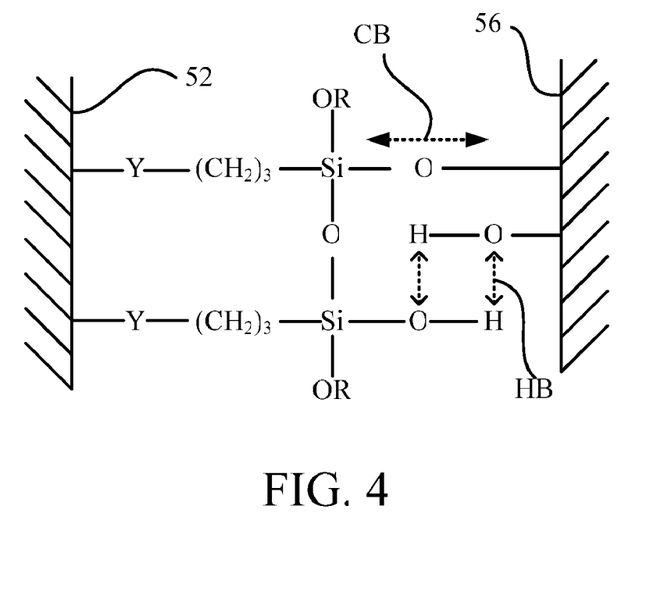
FIG. 4 is a schematic diagram illustrating the connection relation of the sliane coupling agent with the polymer (PMMA) and the inorganic particles ($SiO_2$).

Please refer to FIG. 4. FIG. 4 is a schematic diagram illustrating the connection relation of the sliane coupling agent with the polymer 52 (PMMA) and the inorganic particles 56 ($SiO_2$). As shown in FIG. 4, the sliane coupling agent could be regarded as the bridge between the organic polymer and the inorganic particles, which are connected to be a complex particle with villiform and core-shell structure through not only van der Waals force by static attractive force and hydrogen bond HB but also covalent bond CB. In view of the above, the complex particle with villiform and core-shell structure in the embodiment is formed by a different method to that for complex microspheres of PMMA-silicon dioxide with strawberry-shaped structure in the prior literature (Acta Polymer Sinica, No. 6 2006). The advantage of the complex particles with villiform structure is capable of forming a villiform or net structure; therefore, even only a few of complex particles could also enhance the diffusion effect.

There are two examples below for the basis of the preparing method for coating PMMA microspheres with silicon dioxide of the invention.

Example 1

First, 1 g of the dispersant-and-interface-modifier agent, such as VTEO, MEMO, or an interfacial agent which includes a derivative with a methyl functional group or non-ionic fatty acid, is taken to be dissolved in 240 ml of pure water by pre-stirring and stifling for 30 minutes by a homogenizer. 12.5 g of silicon dioxide powder is slowly added in the above solution, which is then performed by a wet ball grinding and dispersing process by a nano wet dispersing-grinding equipment, such as the wet grinding machine of product model no. Drais PLM-H/V. Before the grinding, the silicon oxide particles are performed by an initial particle size analysis, and the result is that: the median particle size (D50) is 2 micrometers to 3 micrometers; the limit particle size (D100) is less than 10 micrometers; and the viscosity is less 100 cps.

The conditions and parameters of the grinding are listed as the following: using 0.2 mm of grinding balls of YSZ (yttria-stabilized zirconia), ceramic operation unit being S.S Gear pump (power is set at 1.2 KW), 75% of filling rate of grinding balls, 0.1 mm of filter gap, 3200 rpm rotation speed of grinding cylinder, 360 min of grinding time, and 390 KWh/t of energy specific energy. The grinding and stifling continue for 360 minutes. The dispersed silicon dioxide solution which has been processed by the above grinding is collected. 5 ml of the solution is got to be analyzed by the Zeta-potential particle size analyzer; the analysis result is that the median particle size (D50) is less than 150 nm. So far the weight percent concentration of the nano-sized silicon dioxide solution is 5 wt %.

In this example, the following steps are performed in order to prove the optical properties of the modified nano-sized silicon dioxide. 100 ml is got from the silicon dioxide solution and then adds 1 g of sliane coupling agent of VTEO. The above solution is accommodated in a 250 ml heating-regenerating apparatus to be stirred continuously. The temperature for heating is kept at 80 degrees in Celsius. After 24 hours, the silicon dioxide solution with the sliane coupling agent is put in a centrifugal beaker to be centrifugally washed for four times. The solute thereof is then dried for 24 hours at 50 degrees in Celsius, and the nano-sized silicon dioxide particles processed by the interface modification are therefore formed.

Example 2

First, the PMMA particles are processed by the interface modification. 5 g of the PMMA particles is added into a beaker containing 100 g of pure water and is stirred. 1 g of ion additive more and 2-(methacryloyloxy) methyl-trimethylammonium chloride are added in. The solution is stirred and heated to 70 degrees in Celsius and the pH thereof is adjusted to around 2 to 3 by less acid solution. After heating and regenerating the solution for 4 hours, the charge on the surface of the PMMA particles is measured by a Zeta-potential meter to be with positive charge. At last, the PMMA particles are taken out after the solid-liquid separation and then dried in vacuum for 24 hours, and the modified PMMA particles are therefore prepared.

Example 3

500 ml of the solution (the nano-sized silicon dioxide solution of weight percentage of 5 wt %) made after the dispersing and grinding in the example 1 is taken and added into a beaker. 0.2 g of the sliane agent of VTEO is then added in the solution. 250 ml of the solution with the nano-sized silicon dioxide particles processed with the interface modification is taken to be processed by ultrasonic vibration, disposed in a beaker of a heating-regenerating apparatus and then heated to 55 degrees in Celsius continuing for 4 hours. 4 g of the modified PMMA particles is added in the solution and stirred for 24 hours. The PMMA particles with nano-sized silicon dioxide particles adsorbed thereon are formed and then processed by deflating-and-filtering and washing with pure water several times. The solute thereof is then dried in vacuum for 24 hours, and the chemical complex particles are therefore formed.

Figure 5A:
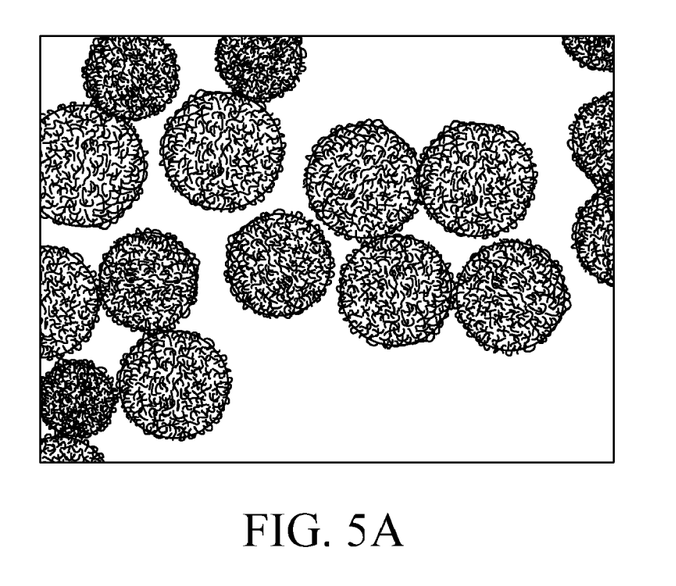
FIG. 5A is a diagram of a picture of the chemical complex particles in the example 2 according to the invention.
Figure 5B:
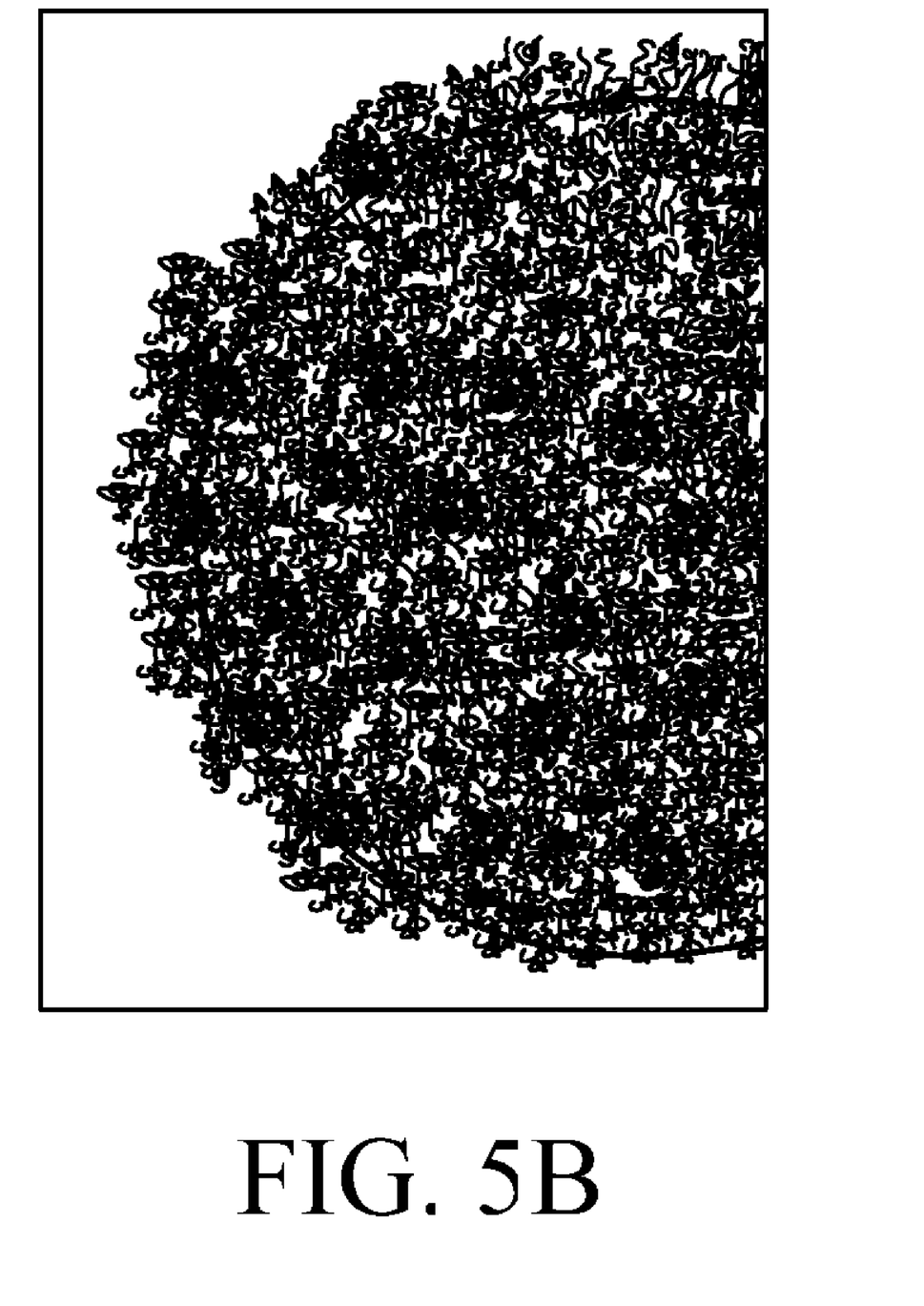
FIG. 5B is a diagram of the enlarged picture of the chemical complex particles in FIG. 5A.

The finished chemical complex particle is analyzed. Please refer to FIGS. 5A and 5B. FIG. 5A is a diagram of an SEM picture of the chemical complex particles in the example 2 according to the invention. FIG. 5B is a diagram of the enlarged SEM picture of the chemical complex particles in FIG. 5A. As shown in FIG. 5A, there is a villiform structure, i.e. the nano-sized silicon dioxide particles of the invention, on the surface of the PMMA particle by coating under SEM. The physical properties of the chemical complex particle with villiform structure of the embodiment are listed in a table 1.

TABLE 1

| particle size (μm) | max. cracking temp. (° C.) | Tg (° C.) | refractivity (%) |
| --- | --- | --- | --- |
| 0.5~30 | 375~390 | 128~140 | 1.41~1.52 |

Example 4

1 g of the chemical complex particles with villiform structure in the embodiment, 9 g of optical acrylic gel (containing light initiator), and 0.1 g of light stabilizer are mixed by a homogenizer for 1 hour to form a solution of 10 wt % of chemical complex particles. 5 ml of the solution drops on a PET substrate to form a film by an auto-coating machine. The thin film is then irradiated by ultraviolet ray to be formed with a thickness of around 20 micrometers to 40 micrometers. The surface roughness is analyzed by α-step measurement and the result thereof is listed as the following: mean surface roughness being $0.5~3.0*10^4$, and the film thickness of the original PMMA particle not coated with silicon dioxide being about $1.5~2.5*10^3$. The former thickness (Ra) is larger than the latter by 10 times. The haze meter is used for analysis in accordance with Japan standard BP-2000. The haze of the chemical complex particles with villiform structure of the invention has rose up to 1~3 times higher than the original PMMA particles.

The modified silicon dioxide particles are dispersed and adsorbed on the surface of the PMMA particles, so as to form the chemical complex particles with villiform structure of the invention. The modified particles on the surface could offer the complex material a good optical diffusion property. Compared with the complex particle of MMA monomer mixed with silicon dioxide in the prior art, the sphere structure of the chemical complex particles of the invention is a villiform and core-shell structure, which is realized by the method of coating macromolecule PMMA particles with silicon dioxide particles thereon. The complex particle with villiform structure for optical diffusion has a different diffusion effects because of the different coefficients of refractivity of the inner PMMA particle and the silicon dioxide particles coated thereon. The total diffusion efficiency is higher than that of mono-PMMA microsphere. The chemical particle has multiple light refraction and scattering and implies a design of both diffusion and reflection.

In the synthesis process, the sliane coupling agent could be regarded as the bridge between the PMMA particles and the nano-sized silicon dioxide particles. The PMMA particles (core) processed by the interface modification (ion additive) and the silicon dioxide (shell) (sliane coupling agent) enhance the static attractive force between the core and the shell. Besides van der Waals force and hydrogen bond, there is Si—O—Si covalent bond existing on the surface of the particle and enhancing the adsorption on the surface of the PMMA particle, so as to form the complex particle with villiform structure.

With the example and explanations above, the features and spirits of the invention will be hopefully well described. Those skilled in the art will readily observe that numerous modifications and alterations of the device may be made while retaining the features and spirit of the invention. Accordingly, the above disclosure should be construed as limited only by the metes and bounds of the appended claims.

What is claimed is:

1. A preparing method for coating PMMA particles with silicon dioxide, comprising the following steps of:
   preparing a silicon dioxide solution by mixing a silicon dioxide powder and a solvent;
   adding a dispersant-and-interface-modifier agent into the silicon dioxide solution;
   performing a wet grinding to the silicon dioxide solution with the dispersant-and-interface-modifier agent so as to obtain a plurality of nano-sized silicon dioxide particles;
   adding the PMMA particles into the silicon dioxide solution;
   making the PMMA particles adsorb the nano-sized silicon dioxide particles; and
   performing a solid-liquid separation process to the silicon dioxide solution.

2. The preparing method for coating PMMA particles with silicon dioxide of claim 1, before the step of adding the PMMA particles into the silicon dioxide solution, further comprising the following step of:
   performing an interface modification to the PMMA particles by a coating interface modifier.

3. The preparing method for coating PMMA particles with silicon dioxide of claim 2, wherein the coating interface modifier is a cation additive which comprises one selected from the group of 2-(methacryloyloxy)methyl-trimethylammonium chloride, 2-(methacryloyloxy)ethyl-trimethylammonium chloride, a mixture of 3-methacryloxy-propyl-trimethoxysilane with hydrochloric acid or sulfuric acid, and a mixture of 2-(methacryloyloxy)methyl-trimethylammonium chloride with 2-(methacryloyloxy)ethyl-trimethylammonium chloride.

4. The preparing method for coating PMMA particles with silicon dioxide of claim 1, wherein the dispersant-and-interface-modifier agent comprises a silane-coupling agent represented by the following chemical formula:

wherein R represents $CH_3$, $C_2H_5$, or $(CH_2)_2OCH_3$, Y represents a functional group and is $CH=CH_2$, $H_2N$, $CH_2=CHCH_3COO$, or $CH_2OCHCH_2O$, and n is 0 or 3.

5. The preparing method for coating PMMA particles with silicon dioxide of claim 1, wherein the dispersant-and-interface-modifier agent comprises an interfacial agent which comprises a derivative with a methyl functional group or non-ionic fatty acid.

6. The preparing method for coating PMMA particles with silicon dioxide of claim 1, wherein a weight percent concentration of the silicon dioxide powder to the silicon dioxide solution is 1% to 30%.

7. The preparing method for coating PMMA particles with silicon dioxide of claim 1, wherein a weight percent concentration of the dispersant-and-interface-modifier agent to solute of the silicon dioxide solution is 1% to 50%.

8. The preparing method for coating PMMA particles with silicon dioxide of claim 1, wherein a median particle size of the nano-sized silicon dioxide particles after the wet grinding is between 20 nanometers to 250 nanometers.

9. The preparing method for coating PMMA particles with silicon dioxide of claim 1, wherein the chemical complex particle is formed by PMMA and silicon dioxide, a particle size of the chemical complex particle is between 100 nanometers to 100 micrometers.

10. The preparing method for coating PMMA particles with silicon dioxide of claim 1, wherein the solid-liquid separation process comprises the following steps of:
    centrifugally washing or deflating-and-filtering the silicon dioxide solution; and
    getting a solute from the silicon dioxide solution and drying the solute so as to obtain the chemical complex particles.

11. The preparing method for coating PMMA particles with silicon dioxide of claim 1, wherein the solvent is pure water, IPA, MEK, or methylbenzene.

* * * * *